Jan. 7, 1941.　　　　E. M. CHANCE　　　　2,228,200
CONTROL SYSTEM
Filed March 13, 1939　　　5 Sheets-Sheet 1

Inventor
Edwin M Chance
by his Attorneys
Howson & Howson

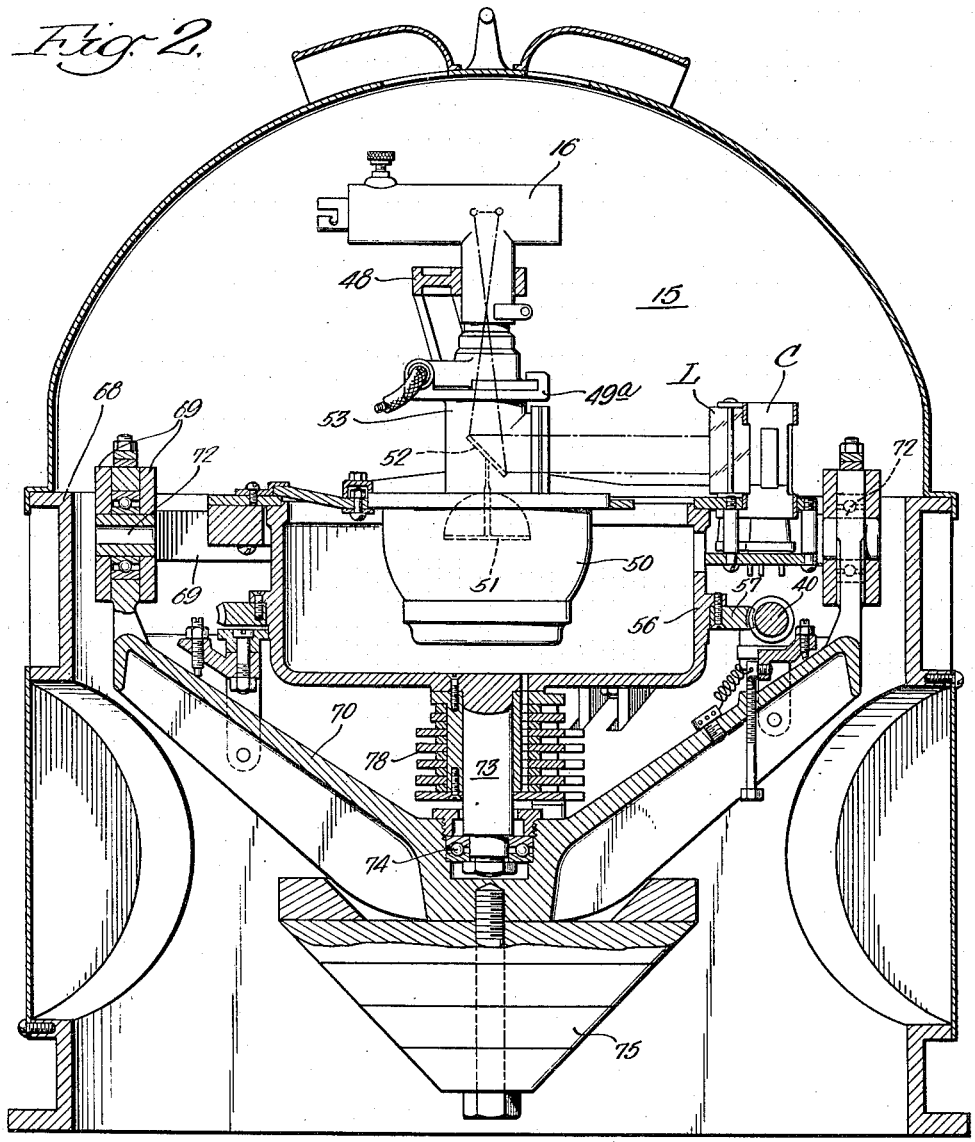

Jan. 7, 1941. E. M. CHANCE 2,228,200
CONTROL SYSTEM
Filed March 13, 1939 5 Sheets—Sheet 3

Inventor
Edwin M. Chance
by his Attorneys
Howson & Howson

Jan. 7, 1941. E. M. CHANCE 2,228,200
CONTROL SYSTEM
Filed March 13, 1939 5 Sheets-Sheet 4
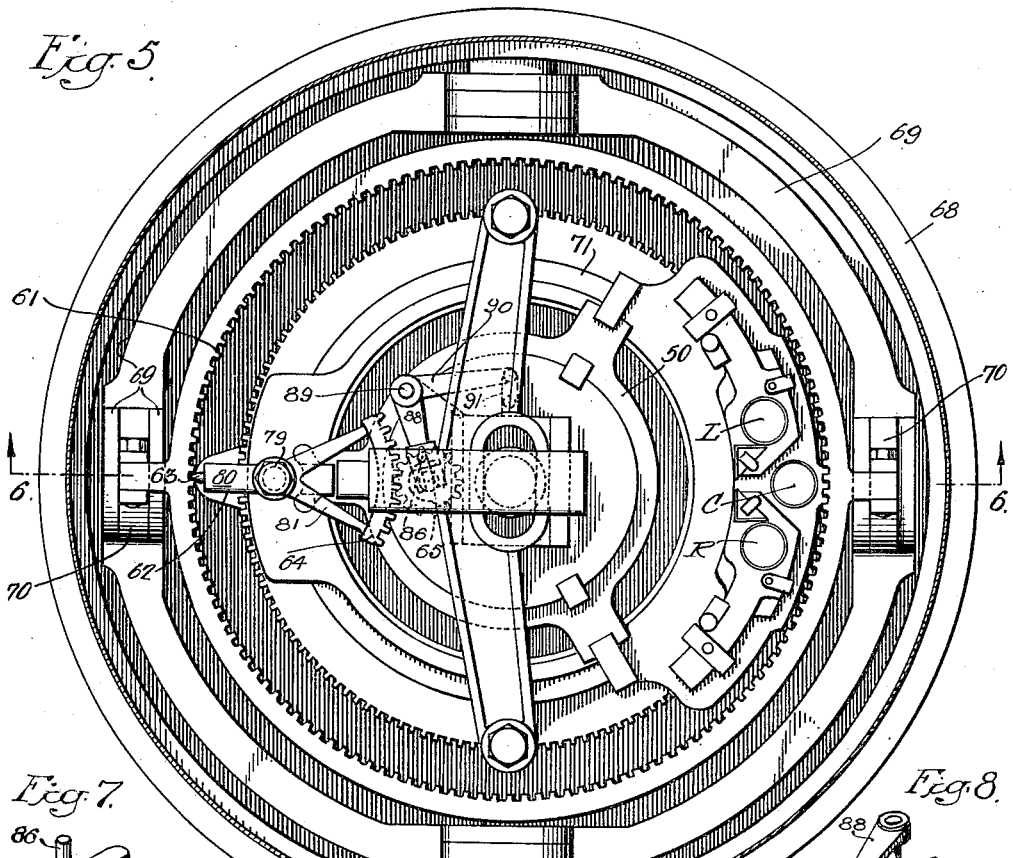
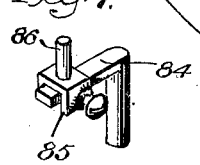
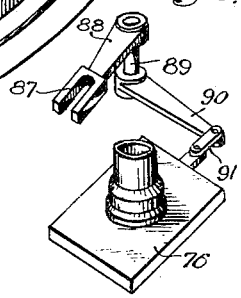
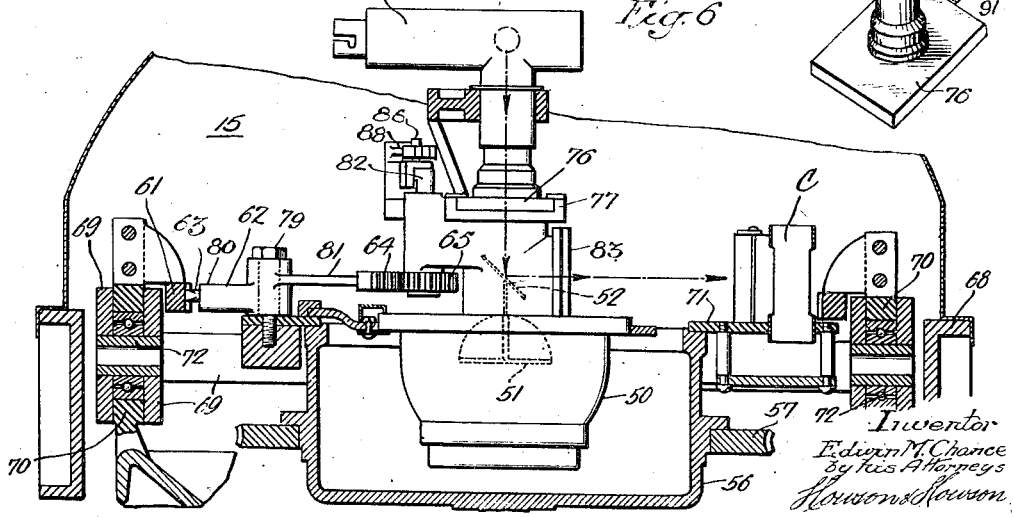
Inventor
Edwin M. Chance
by his Attorneys
Howson&Howson Jan. 7, 1941.     E. M. CHANCE     2,228,200
CONTROL SYSTEM
Filed March 13, 1939     5 Sheets—Sheet 5

Inventor
Edwin M. Chance
by his Attorneys
Howson & Howson

Patented Jan. 7, 1941

2,228,200

UNITED STATES PATENT OFFICE 2,228,200

CONTROL SYSTEM

Edwin M. Chance, Haverford, Pa., assignor to Britton Chance, Mantoloking, N. J.

Application March 13, 1939, Serial No. 261,640

11 Claims. (Cl. 172—239)

This invention relates to electrical control apparatus of the follow-up type and, more particularly, to a novel system of this character wherein the follow-up action is effected in a novel manner to produce varying control effects.

Electrical control systems of the follow-up type may be said to include generally some control means including relatively movable elements, a telemotor system operable by the control means for performing the desired control action, and a follow-up system operable by the telemotor to produce follow-up relative movement between the said control elements so as to restore the normal quiescent condition of the control means. Thus, in the case of an automatic steering system for dirigible craft, such as ships, there is provided some control means constructed and arranged to be responsive to deviations of a craft from its course, a telemotor system including a steering motor operable by the control means to effect throw of the craft's steering rudder, and a follow-up system operable by the telemotor to restore the control means to its normal quiescent condition.

Since any telemotor system will inherently introduce error whenever the direction of operation changes, due to time lag in the operation of its parts, it is practically necessary to compensate for such error. Further, in the case of an automatic steering system, it is frequently desired to give the rudder a relatively great throw whenever the craft changes its direction of yaw, the rudder throw being in a direction to tend to overcome the yaw or deviation and bring the craft back on its course. This action, which is commonly referred to as "initial rudder" is introduced by causing the steering motor to operate for a relatively long period of time when the direction of the craft's yaw changes.

By the present invention, there are provided novel methods and means for compensating for telemotor error and, if desired, for introducing initial rudder action. While the invention is applicable generally to control systems of the follow-up type, it will be described with particular reference to an automatic steering system since it is particularly adapted for use in such a system.

The principal object of the invention is to provide in a system of the stated character novel means for producing and combining different effects so as to produce a resultant follow-up action which compensates for telemotor error and which may also introduce initial rudder action whenever desired.

Other more specific objects of the invention, as well as the novel features thereof, may be more clearly understood by reference to the accompanying drawings.

In the drawings:

Fig. 2 is a sectional elevational view of the control device of Fig. 1;

Fig. 5 is a plan view of the control device of Fig. 4;

Fig. 6 is a fragmentary sectional view taken along line 6—6 of Fig. 5;

Figs. 7 and 8 are perspective views of certain parts of the same device;

Figure 1:
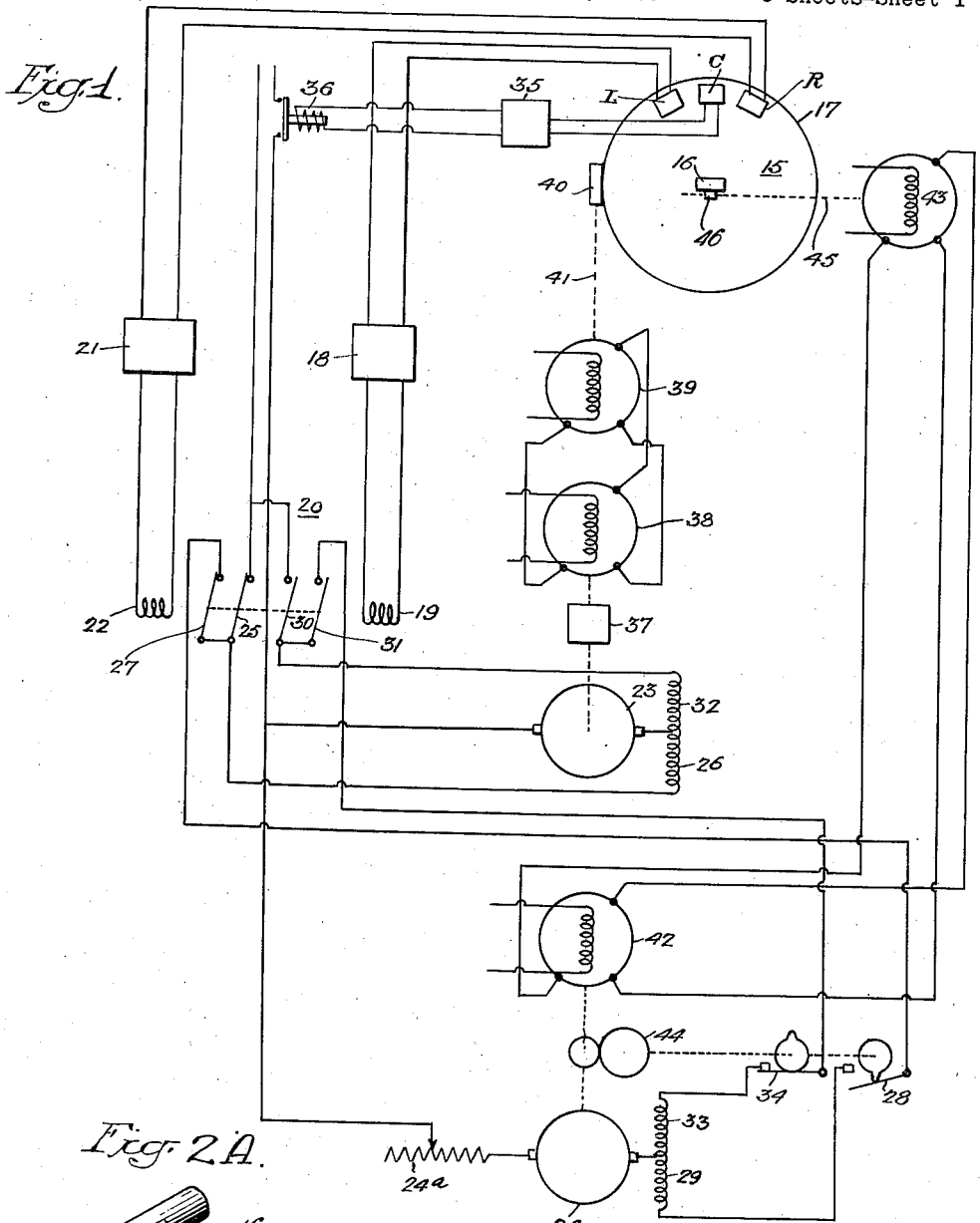
Fig. 1 is a diagrammatic illustration of one form of the invention employing an electrical system including self-synchronous devices.

Referring first to Fig. 1, there is provided a control device 15 which in the present instance is of the type employing light-sensitive cells, although this control device may be any device of the type comprising relatively movable elements constructed and arranged for relative movement in response to some condition variation which it is desired to control. In the illustrated device, 16 represents a source of a light beam; 17 is a supporting plate rotatable relative to the beam about a center axis in response to variation of the condition being controlled; L and R are left and right hand light cells carried by the support 17; and C is a center cell also carried by the said support. A detailed illustration of the mechanical details of the control device is shown in Fig. 2 which will be described hereinafter. A control device of this general type is also shown in U. S. Patent No. 2,102,511.

The left hand cell L is connected through suitable amplifying apparatus 18 to the winding 19 of a double-acting relay 20. Similarly, the right hand cell R is connected through amplifying apparatus 21 to the winding 22 of the relay. The amplifiers 18 and 21 may be of conventional form for example, each of them may comprise one or more conventional vacuum tube amplifiers. The purpose of these amplifiers is, of course, to amplify the current impulses generated by the light-sensitive cells.

The relay 20 serves to control the energization of the steering motor 23 and the pilot motor 24, the purpose of which will be described presently. Each of these motors is reversible and the direction of rotation of each is controlled by the relay 20. The relay may comprise a plurality of movable contact arms operated in unison, as indicated by the broken-line representation. The contact arms may be operated conveniently by means of a single armature to which they may be attached. When the winding 19 is energized, the contact arms are in the position shown, the arm 25 closing a circuit for the steering motor 23 through the field winding 26, and the arm 27 closing a circuit for the pilot motor 24 through switch 28 (when closed) and field winding 29. When the winding 22 is energized, these contact arms are opened and the contact arms 30 and 31 are closed, the arm 30 closing a circuit for the steering motor 23 through its field winding 32, and the arm 31 closing a circuit for the pilot motor 24 through its field winding 33 and switch 34. Thus, the relay 20 serves to energize each motor through one or the other of its field windings to effect operation of the motor in either direction. It will be noted that the energizing circuits for the pilot motor 24 include limit switches 28 and 34, which will be discussed hereinafter.

The center cell C may be connected as illustrated, through amplifier 35 to relay 36, so that when the cell is activated the supply circuit is opened to deenergize the motors.

The motor 23 in the case of an automatic steering system serves to operate the rudder of the draft, as will be well understood. The portion of the system extending from the control device 15 to and including the motor 23 constitutes the telemotor system above-mentioned. The rotor of motor 23 is mechanically connected through a suitable control mechanism 37 to the rotor of a self-synchronous device 38. The device 37 may take the form of a conventional manually controlled gear drive to rotate the rotor of device 38 at a desired speed. The device 37, therefore, may be manually adjustable to obtain different speeds of the device 38. The device 38 constitutes the transmitter of a simple "selsyn" system which also includes a receiver 39. The latter is connected to a follow-up worm 40 by suitable means, such as the mechanical connection indicated at 41. The worm 40 engages a worm wheel on the cell support 17. Thus, the motor 23 effects rotation of the cell support 17 in either direction through the medium of the "selsyn" system.

The purpose of the pilot motor 24 and its associated elements is to vary the follow-up action in a manner to compensate for the telemotor error and to introduce initial rudder action, if desired. The pilot motor 24 drives a self-synchronous transmitter 42 which is connected to a receiver 43 which, in turn, operates a screw or worm 46 through the driving connection indicated at 45. The screw 46 moves the light source 16 so as to shift the light beam relative to the light-sensitive cells, as will be more clearly understood from the subsequent description of Figs. 2 and 2A.

The motor 24 also drives the cams for limit switches 28 and 34 through the medium of reduction gearing 44. By having the cams of the limit switches adjustable on their common shaft, the action of the limit switches may be varied at will to obtain various results, as set forth hereinafter.

In order to vary the speed of the motor 24, there is preferably provided a suitable control device, such as the rheostat 24a, included in circuit with the said motor.

The various results which may be obtained by means of this apparatus may be seen by considering the operation of the system as a whole. Assuming for the sake of illustration that the apparatus is employed for automatic steering of a ship, normally with the ship proceeding on its course, the light beam will fall on the center cell C and the quiescent state of the system will obtain. The illustrated position of relay 20 and the limit switches 28 and 34 indicate that the last deviation of the ship from its course was in a direction to cause actuation of the left hand cell L. Suppose now that the direction of yaw of the ship changes, causing the cell plate 17 to move about its pivot counter-clockwise as viewed in the figure, thus bringing cell R into alignment with the stationary light beam. As a result, the winding 22 of relay 20 is energized, thus opening contacts 25 and 27 and closing contacts 30 and 31. In the meantime, the movement of cell C out of alignment with the beam will have caused deenergization of relay 36. The resultant energization of the steering motor 23 causes the motor to operate the rudder (not shown) in a direction to bring the craft back on its course. At the same time, the motor 23 operates the transmitter 38 in such direction that the receiver 39 will rotate in a direction to actuate the cell plate 17 clockwise, thus tending to bring the center cell into coincidence with the beam and energize relay 36. Simultaneously with the energization of the motor 23, however, the pilot motor 24 is energized through the limit switch 34 and actuates the transmitter device 42 until the motor circuit is opened by the limit switch. By adjusting the limit switches as above mentioned, the actuation of the "selsyn" system 42—43 may be effected for a desired period of time. Moreover, the rate or speed of actuation of the screw 46 may be varied by varying the speed of the pilot motor by means of the speed-control rheostat 24a.

Since the limit switch 28 closes when the limit switch 34 opens, the system is conditioned for operation in the opposite direction whenever the craft changes its direction of yaw. The operation of the system in the opposite direction will be clearly understood from the above description.

Thus, when the motor 24 is at standstill, the normal follow-up action is effected by means of the "selsyn" system 38—39, the worm 40 driving the support 17 in a direction to effect follow-up action. When the motor 24 operates, however, the "selsyn" system 42—43 operates to drive the screw 46 in a direction and at a speed dependent upon the direction and speed of the motor 24. Since the screw 46 moves the light source and beam relative to cells, it will be seen that if the direction of movement of the beam is the same as the follow-up movement of support 17, the resultant follow-up movement will be at a rate less than normal, and the restoration of the normal quiescent condition of the apparatus will be delayed until the pilot motor 24 is stopped by one of the limit switches, at which time the follow-up action will proceed at the normal speed. The net result, of course, is an increase in the time required to restore the normal quiescent condition, thus causing the steering motor to operate for a longer period of time. This action, which takes place whenever the direction of operation reverses, compensates for the telemotor error and may also be made to introduce initial rudder action.

Obviously the relatively slow follow-up action may be caused to extend into subsequent deviations in the same direction by adjusting the limit switches accordingly. However, when the effective limit switch opens, normal follow-up action obtains again until the direction of operation reverses again.

Figure 2A:
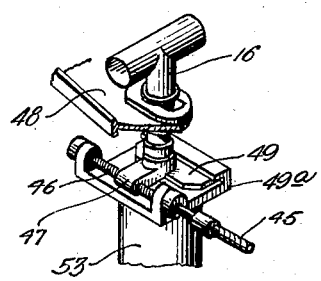
Fig. 2A is a fragmentary perspective view illustrating the mounting of the light source employed in Figs. 1 and 2.

Reference may now be had to Fig. 2, which shows the control device 15 in mechanical detail. In the illustration of Fig. 2, a magnetic compass 50 is carried by a bowl support 56, and on the compass card 51, there is mounted a mirror 52 which receives light from the light source within the casing 16 and reflects the light beam onto the light cells. As illustrated by the dot and dash lines, the beam passes downward through the hollow casing 53. The lamp assembly is slidably mounted on the guide and support 49a (see Fig. 2A) and carries a guide plate 49 and a nut member 47 which is threadedly engaged by screws 46. A slotted bracket 48, also carried by the bowl support 56, serves to support the upper part of the lamp assembly. The light cells are also carried by the rotatable bowl support 56 on which there is provided a wormwheel 57 meshing with the follow-up worm 40.

The entire mechanism is mounted by means of gimbal ring 69 on the binacle support 68 which is mounted on the craft. The bowl support 56 is rotatably carried by a yoke 70 suspended from opposed pin bearings or journals 72 on the gimbal ring. A downwardly extending stud 73 on the cup-shaped support 56 is rotatably supported by a bearing 74 on the yoke 70, as illustrated. The slip ring structure 78 enables electrical connection to the cells. The weight 75 resists movement of the yoke.

When such a device is employed in the system of Fig. 1, the receiver 39 operates the worm 40 to effect follow-up movement of the cell support, and the receiver 43 drives the screw 46, thus moving the lamp assembly. As a result, the relation of the reflected beam relative to the light cells is varied.

Figure 3:
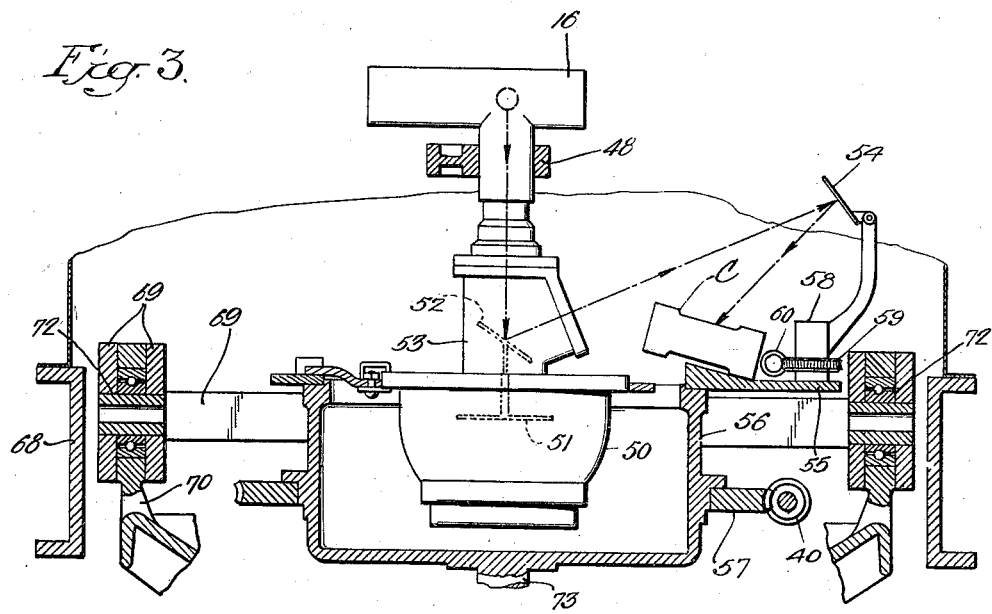
Fig. 3 is a fragmentary sectional view of a modified form of the control device which may be employed in the system of Fig. 1.

In Fig. 3, there is illustrated an alternative form of the control device which may be used in the system of Fig. 1 and in which the desired action is obtained by moving a reflector instead of the light source. In this instance, the lamp assembly is fixedly mounted at the top of casing 53. A reflector 54 is mounted on a rotatable support 58 carried by plate 55 which also supports the cells. The reflectors 52 and 54 and the light cells are arranged so that the light beam is reflected onto the cells, as illustrated by the dot and dash lines. The support 58 carries a worm wheel 59 with which there is meshed a worm 60.

When this device is employed in the system of Fig. 1, the action is the same as above described, except that the driving connection 45 drives the worm 60 to rotate reflector 54 and thus move the reflected beam relative to the light cells.

Figure 4:
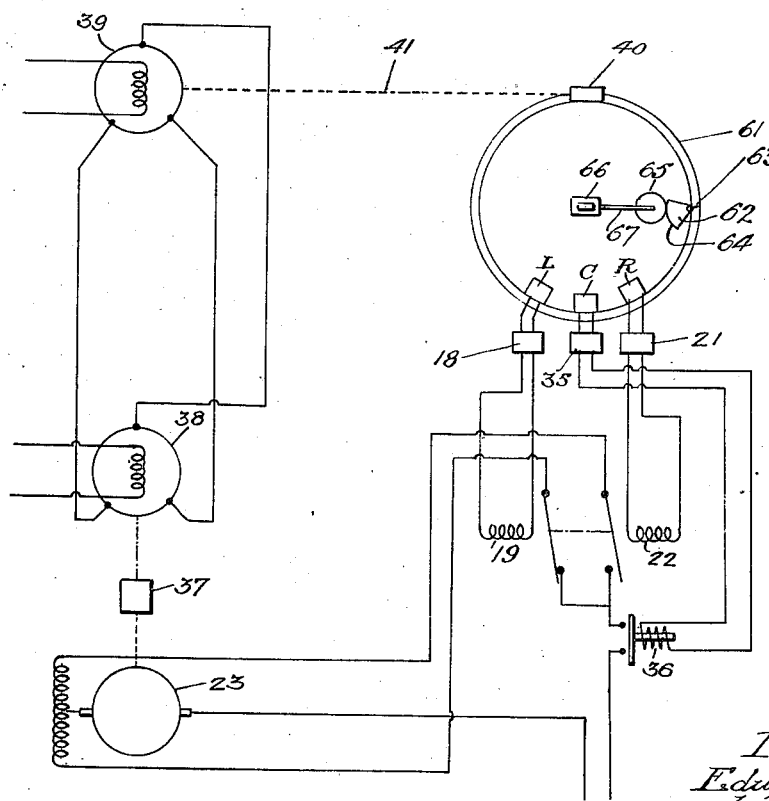
Fig. 4 is a diagrammatic illustration of a further form of the invention.
Figure 9:
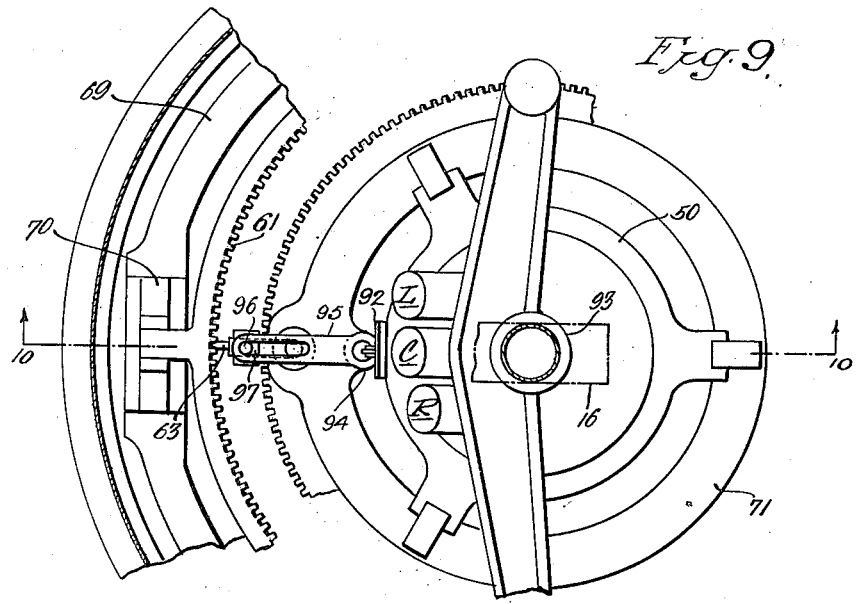
Fig. 9 is a partial plan view of a modified form of the control device which may be used in the system of Fig. 4.
Figure 10:
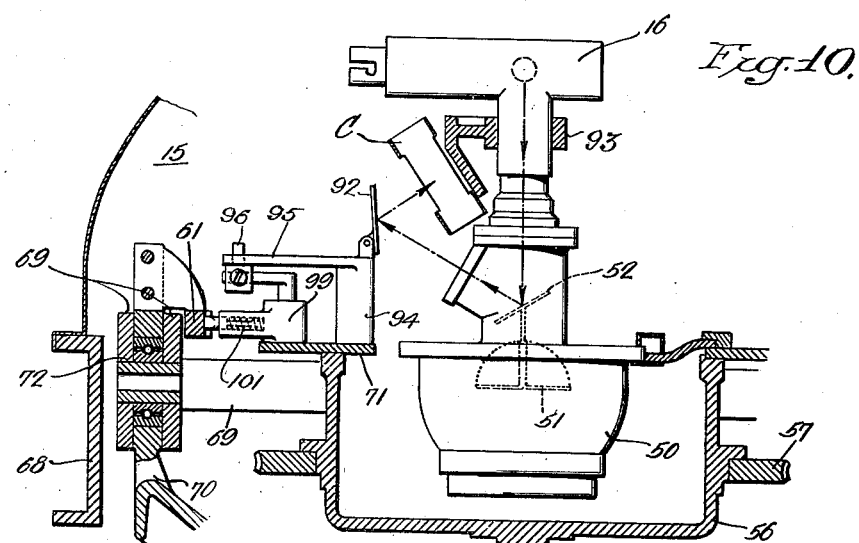
Fig. 10 is a fragmentary sectional view taken along line 10—10 of Fig. 9.
Figures 11, 12:
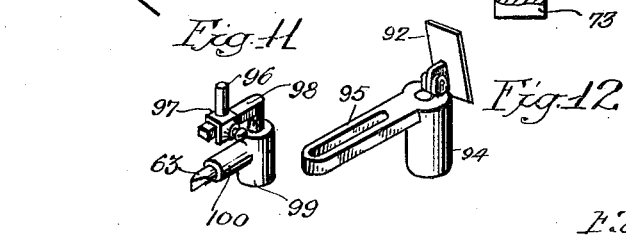
Figs. 11 and 12 are perspective views of certain parts of the same device.

In Fig. 4, there is illustrated a further modification of the invention wherein the variation in follow-up action is obtained by means of the device shown in detail in Figs. 5 to 8. The system of Fig. 4 employs a follow-up system which may comprise a simple "selsyn" drive. In this instance, however, instead of employing an auxiliary "selsyn" system to effect variation in the follow-up action, there is employed a mechanical device for automatically shifting the light source during a portion of the follow-up operation, which device comprises a stationary internal gear rack 61, a pivoted member 62 carrying a pawl 63 which cooperates with the gear rack 61, as described hereinafter, and a gear segment 64 on member 62 meshing with pinion 65, which effects movement of the lamp casing 66 through a mechanical linkage indicated at 67.

Referring to Figs. 5 to 8 for the details of this device, a lamp carriage 76 is slidably mounted in guide 77 and carries the lamp housing 16. The gear rack 61, shown schematically in Fig. 4, is carried by the yoke 70, as clearly shown in Figs. 5 and 6. The member 62 is pivoted at 79 and is carried by the cell support 71. The member 62 has a hollow arm 80 carrying the pawl 63, the pawl being freely seated in the arm 80 and being urged outward by a small spring (not visible). The member 62 also comprises arms 81 which carry the gear segment 64 which meshes with the pinion 65. The pinion is carried by a shaft 82 rotatably carried by the supporting structure 83. On the upper end of shaft 82, there is provided a crank arm 84 (see Fig. 7) to which there is attached an adjustable yoke 85 carrying a pin 86 disposed within the bifurcated end 87 of arm 88 (see Fig. 8). The latter arm is mounted on a shaft 89, which is also rotatably carried by the supporting structure 83. A second arm 90 fixed to shaft 89 is connected by link 91 to the lamp carriage 76.

Considering the operation of this device and assuming that the pawl 63 is engaged with the gear rack, when the ship deviates from its course, the system functions as above described and the follow-up drive operates to move the cell support 71 in a direction to tend to restore the normal condition. However, the follow-up movement of the cell support relative to the gear rack 61 causes the member 62 to move about its pivot, thereby rotating shaft 82 and causing pin 86 to move the linkage 88—90 so as to move the lamp carriage 76 in a direction to move the beam relative to the light cells opposite the direction of the follow-up movement, thus delaying the follow-up action. After a predetermined interval, however, the member 62 rotates sufficiently to disengage the pawl 63 from gear rack 61 and the follow-up action proceeds normally. For subsequent deviations in the same direction, the pawl and rack mechanism is not effective since the pawl remains disengaged from the gear rack.

When the ship deviates in the opposite direction, the reversal of the follow-up movement causes the pawl to again engage the gear rack and the mechanism functions as before to delay the follow-up action.

Thus, during a portion of the first deviation in either direction, the pawl and rack mechanism is effective to delay the follow-up action and this mechanism may be designed or adjusted to compensate for the telemotor error and may also, if desired, introduce initial rudder action. It will be apparent that the extent of the action by the pawl and rack mechanism may be varied by adjusting the yoke 85 along the crank arm 84.

In Figs. 9 to 12, there is illustrated a modified form of the same device wherein the pawl and rack mechanism is arranged to vary the position of a reflector instead of shifting the light source. In this instance, the compass card reflector 52 is arranged to reflect the light beam onto a second reflector 92 which, in turn, reflects the beam onto the light cells which, in this instance, are carried by a bracket 93. The reflector 92 is carried by a rotatable support 94 which is mounted on the cell support 71. A slotted arm 95 carried by support 94 is engaged by a pin 96 carried by the adjustable yoke 97 which is mounted on crank arm 98 (see Figs. 11 and 12). The crank arm 98 is carried by member 99 which is rotatably mounted on the cell support. A hollow arm 100 formed integrally with member 99 carries the pawl 63 which is urged outwardly by a spring 101 (see Fig. 10). The pawl 63 engages the gear rack 61 mounted on the yoke 70 as in the above-described device.

The operation of this device is similar to that of the previously-described device, the only difference being that, in this instance, the pawl and rack serve to rotate the mirror 92, thus varying the position of the reflected beam relative to the light cells, as will be clearly apparent.

Although various embodiments of the invention have been illustrated and described, it will be understood that further modifications of the invention are possible within the scope thereof.

I claim:

1. In an electrical controlling apparatus of the follow-up type, a light source, a support movable relative to the light beam from said source, light-sensitive means carried by said support and arranged for actuation by said beam in response to movement of the support, a telemotor system operable by said light-sensitive means, a follow-up system operable by said telemotor system to effect follow-up movement of said support, means operable concurrently with the follow-up action for effecting movement of said beam relative to said light-sensitive means, whereby the follow-up action is varied according to the direction and magnitude of the movement of said beam, and means independent of said telemotor system for interrupting the operation of said last means after a predetermined amount of operation thereof.

2. In an electrical controlling apparatus of the follow-up type, a light source, a support movable relative to the light beam from said source, light-sensitive means carried by said support and arranged for actuation by said beam in response to movement of the support, a telemotor system operable by said light-sensitive means, a follow-up system operable by said telemotor system to effect follow-up movement of said support, an electric motor controlled by said telemotor system, and means operable by said motor to effect movement of said beam relative to said light-sensitive means concurrently with said follow-up movement, whereby the follow-up action is varied according to the direction and magnitude of the movement of said beam.

3. In an electrical controlling apparatus of the follow-up type, a light source, a support movable relative to the light beam from said source, light-sensitive means carried by said support and arranged for actuation by said beam in response to movement of the support, a telemotor system operable by said light-sensitive means, a follow-up system operable by said telemotor system to effect follow-up movement of said support, an electric motor controlled by said telemotor system, means operable by said motor to effect movement of said beam relative to said light-sensitive means concurrently with said follow-up movement, whereby the follow-up action is varied according to the direction and magnitude of the movement of said beam, and a limit switch arranged to deenergize said motor after a predetermined amount of operation of the apparatus in a given direction.

4. In an electrical controlling apparatus of the follow-up type, a light source, a support movable relative to the light beam from said source, light-sensitive means carried by said support, a reflector arranged to reflect the light beam toward said light-sensitive means, a telemotor system operable by said light-sensitive means, a follow-up system operable by said telemotor system to effect follow-up movement of said support, and means for moving said reflector to effect movement of said beam relative to said light-sensitive means concurrently with said follow-up movement, whereby the follow-up action is varied according to the direction and magnitude of the movement of said beam.

5. In an electrical controlling apparatus of the follow-up type, a light source, a support movable relative to the light beam from said source, light-sensitive means carried by said support and arranged for actuation by said beam in response to movement of the support, a telemotor system operable by said light-sensitive means, a follow-up system operable by said telemotor system to effect follow-up movement of said support, and means including a stationary rack and a pivoted pawl for effecting movement of said beam relative to said light-sensitive means concurrently with said follow-up movement, whereby the follow-up action is varied according to the direction and magnitude of the movement of said beam.

6. In an electrical controlling apparatus of the follow-up type, a light source, a support movable relative to the light beam from said source, light-sensitive means carried by said support, a reflector arranged to reflect the light beam toward said light-sensitive means, a telemotor system operable by said light-sensitive means, a follow-up system operable by said telemotor system to effect follow-up movement of said support, and means including a stationary rack and a pivoted pawl for moving said reflector to effect movement of said beam relative to said light-sensitive means concurrently with said follow-up movement, whereby the follow-up action is varied according to the direction and magnitude of the movement of said beam.

7. In an electrical control apparatus, control means for effecting operation of the apparatus in either direction, said control means including a plurality of relatively movable parts, a reversible telemotor system operable by said control means in either direction, a follow-up system operable by said telemotor system to move one of said parts and thus restore the normal condition of said control means, said telemotor system having inherent time lag in the operation of its parts tending to introduce error whenever the direction of operation changes, and means operative only in response to a directional change to move another part of said control means in a manner to compensate for the time lag of said telemotor system.

8. In an electrical control apparatus, control means for effecting operation of the apparatus in either direction, said control means including light beam-producing means and light-sensitive means, a reversible telemotor system operable by said control means in either direction, a follow-up system operable by said telemotor system to move said light-sensitive means relative to the light beam and thus restore the normal condition of said control means, said telemotor system having inherent time lag in the operation of its parts tending to introduce error whenever the direction of operation changes, and means operative in response to a directional change to move the light beam in a manner to compensate for the time lag of said telemotor system.

9. In an electrical controlling apparatus of the follow-up type, a control device comprising a light source and light-sensitive means arranged for activation by a light beam from said source whenever relative movement takes place between the beam and the light-sensitive means, a first motor, a second motor, means operable by said light-sensitive means for controlling the energization of both said motors, additional means for controlling the energization of said second motor only, follow-up means operable by said first motor to move said light-sensitive means, and means operable by said second motor to move the light beam, to thereby vary the follow-up action.

10. In an electrical controlling apparatus of the follow-up type, a light source, a pair of spaced light-sensitive devices arranged for activation by the light beam from said source, a first reversible motor, a second reversible motor, means operable by said light-sensitive devices for controlling the energization of both said motors, additional means for controlling the energization of said second motor only, follow-up means operable by said first motor to move said light-sensitive devices, and means operable by said second motor to move said light beam, to thereby vary the follow-up action.

11. In an electrical controlling apparatus of the follow-up type, a light source, a pair of spaced light-sensitive devices, a third light-sensitive device between said first devices, the said light-sensitive devices being arranged for activation by the light beam from said source, a first reversible motor, a second reversible motor, means operable by said third light-sensitive device for maintaining said motors deenergized, means operable by said first light-sensitive devices for controlling the energization of both said motors, additional means for controlling the energization of said second motor only, follow-up means operable by said first motor to move said light-sensitive devices, and means operable by said second motor to move said light beam, to thereby vary the follow-up action.

EDWIN M. CHANCE.